Figure 7:
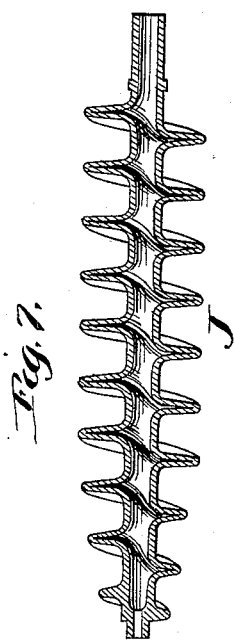

(No Model.) 2 Sheets—Sheet 1.
A. A. DICKSON.
APPARATUS FOR THE MANUFACTURE OF PEAT FUEL.
No. 451,462. Patented May 5, 1891.
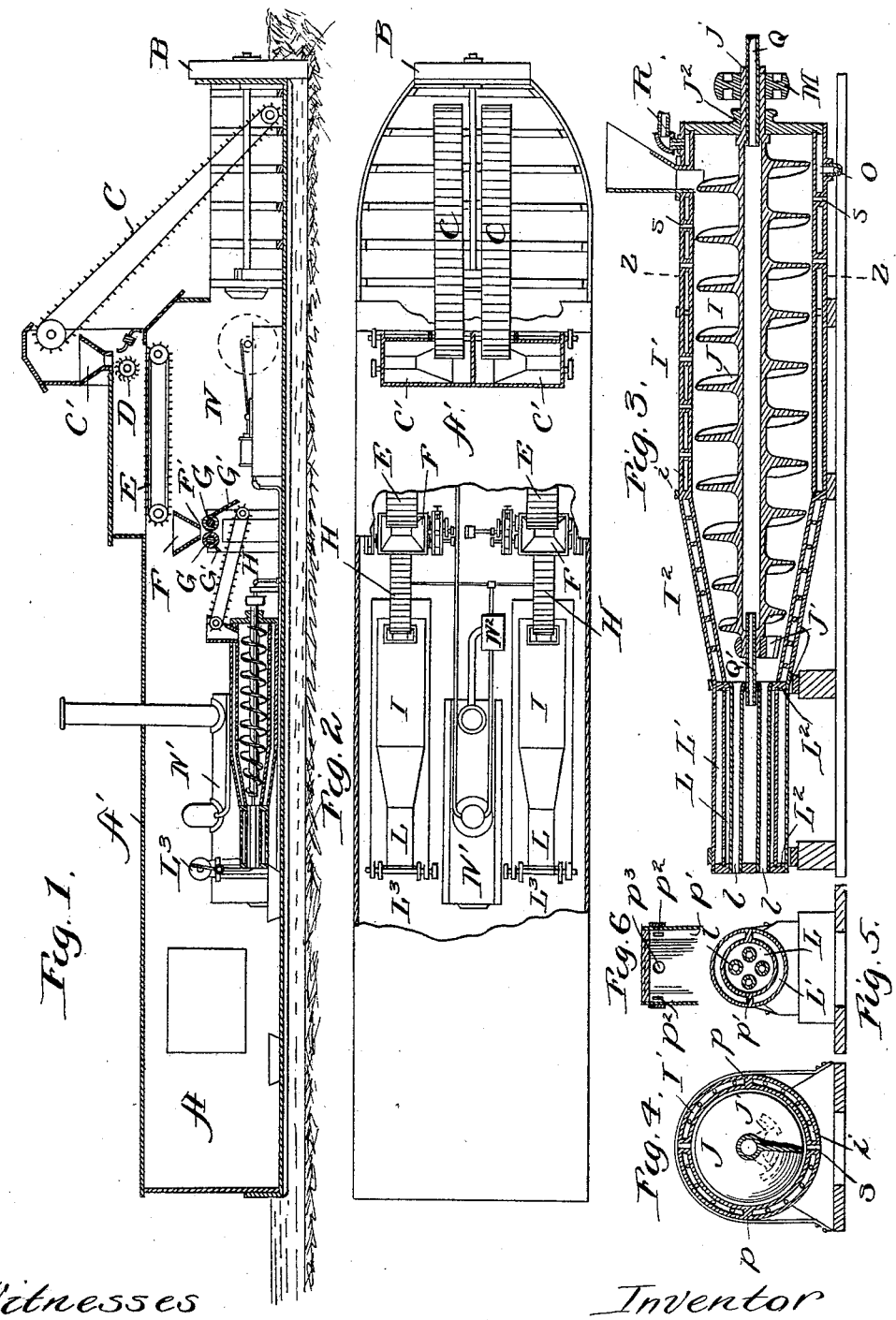
Witnesses
W. F. Keene
James W. Spear
Inventor
Archibald A. Dickson
by Ellis Spear
Atty.

(No Model.) 2 Sheets—Sheet 2.

A. A. DICKSON.
APPARATUS FOR THE MANUFACTURE OF PEAT FUEL.

No. 451,462. Patented May 5, 1891.

Witnesses
W. P. Keene
James McShea

Inventor
Archibald A. Dickson
by Ellis Spear
Atty.

UNITED STATES PATENT OFFICE.

ARCHIBALD A. DICKSON, OF CÔTE ST. ANTOINE, CANADA.

APPARATUS FOR THE MANUFACTURE OF PEAT FUEL.

SPECIFICATION forming part of Letters Patent No. 451,462, dated May 5, 1891.

Application filed December 24, 1888. Serial No. 294,557. (No model.)

*To all whom it may concern:*

Be it known that I, ARCHIBALD ANDERSON DICKSON, of Côte St. Antoine, in the District of Montreal and Province of Quebec, Canada, have invented certain new and useful Improved Apparatus for the Manufacture of Peat Fuel; and I do hereby declare that the following is a full, clear, and exact description of the same.

My invention relates to peat-fuel-making machinery which may either be mounted on a scow floating in a canal cut in the bog or mounted on a platform built on same, and has for its object to produce peat fuel without the intervention of manual labor, its special end being to shorten the present automatic process and to simplify as much as possible the mechanism employed.

For full comprehension of the invention reference must be had to the annexed drawings, in which Figure 1 is a longitudinal section of a scow carrying my apparatus; Fig. 2, a plan view of same with upper deck partly broken away to show apparatus; Fig. 3, a longitudinal vertical section of final-pressure mechanism; Fig. 4, a transverse section of Fig. 3 on line $z\ z$; Fig. 5, a transverse vertical section of forming-chamber; Fig. 6, a transverse horizontal section of end portion of same, taken through steam-jacket; and Fig. 7, a section showing modification of construction of the helix.

Similar letters of reference indicate like parts.

A is the scow of any suitable build and the usual construction of bow, at which the excavating-screw B, operated in any well-known way, is situated, A' being the upper deck.

An elevator C, as usual, carries the crude material up to the hopper C', which directs it upon the stick-catching mechanism D, the construction and operation of which are familiar to those skilled in the art. From this point the peat is taken by a belt or carrier E to the hopper F, beneath which is situated a pair of rollers G G, one of which may be adjustable, so as to increase or diminish the space between them. These rollers are faced with rubber, and it is at this point that my invention may fairly be said to begin. Before reaching these rollers G G but little moisture, comparatively, has drained from the peat; but by the time it has passed between them fully half or even a greater proportion of the moisture has been expelled, and as it is by pressure alone without the application of heat that this is effected the mechanism is necessarily very much simplified. These rollers may be of any desired pattern and construction, such as metal cylinders or solid wood rollers, and are in any case preferably covered with rubber F'. They are carried in suitable bearings and are provided with scrapers G' G', bearing upon their faces, in order to remove any peat that may adhere thereto and insure the passage of the whole mass upon the belt or carrier H to the pressing mechanism.

It may be mentioned that the several belts are of link or slat form in preference to leather, canvas, &c., in order that as much water as possible can drain off naturally.

The pressing mechanism consists of a metal cylinder I, formed in two parts—viz., the cylinder proper I', of even diameter throughout, and the frustum of a cone $I^2$, as shown in Fig. 3. The whole cylinder is surrounded by a steam-jacket $i$, and has set in it a helix or screw J, extending nearly its whole length and carried axially in bearings J' at its forward end and $J^2$ at its rear, the diameter of the helix of course diminishing with the cone-frustum.

The cylinder will be constructed as much as possible with a view to confining heat and to resist the force exerted by the helix in pushing forward the peat to the forming-chamber, and especially from the base of the conical portion to its forward end, the greatest pressure being exerted about this point.

The chamber or part of the apparatus in which the peat is compressed into continuous lengths is a cylinder L, blocked at both ends, having a steam-jacket L' and secured to the forward end of the cone-frustum $I^2$, so that tubes $l$, of desired diameter, extending from end to end of L and through the blocks or end pieces $L^2$ of it, will communicate with the interior of the cone-frustum $I^2$ and have pressed into them the peat pushed forward by the helix J, the mouths of these tubes being preferably flared to facilitate its passage.

At the outer end of the cylinder L any suitable automatic variable cut-off mechanism (indicated by L³) is situated, which by a fast or slow movement will divide the continuous lengths issuing from the tubes $l$ into short or long pieces, as may be desired, these falling into any suitable receptacles in which they may be conveyed to any convenient place for storage.

The rotation of the helix J is effected through pulley M, mounted on the extended end $j$ of its axis, and any desired system of belts, gearing, &c., from a system of shafting operated by the engine N, N' being the boiler in which will be generated the steam required to run the engine, and also for heating purposes in the pressing mechanism just described, that used for the latter being preferably taken through a superheater situated at any convenient point, as indicated at N².

It will be noticed that the mechanism has heretofore been described as single, although shown double in the drawings, the reason being that both sets of mechanism are alike in every particular.

One boiler of requisite horse-power and engine will suffice to run both sets of apparatus, and the same number of hands can as easily superintend two as one.

I will now describe the way in which I secure the desired heating of the cylinder, helix, and forming-chamber.

O is the inlet for superheated steam, situated near the rear end of jacket $i$ on the bottom side, and as this jacket is divided along its entire length into a lower and an upper half by longitudinal diaphragms $p$ $p$ the steam will pass along the lower half through apertures in any ribs formed between the cylinder-body and that of the jacket (which may be placed there for strengthening purposes) and also through perforations in the end piece L² of the forming-chamber L, thus reaching its jacket L', which is similarly divided into lower and upper halves by diaphragms $p'$ $p'$. From the forward end of the lower half of this steam-jacket the steam passes through slots $p^2$ $p^2$ in the diaphragms $p'$ $p'$, as shown in Fig. 6, up into the upper half of the jacket, where it will commingle with another body of steam issuing from the body of cylinder L through an opening $p^3$ in its shell, as shown in Fig. 6, this second body of steam having been introduced through pipe Q to the interior of the helix-shaft, and from it by pipe Q' to the interior of cylinder L, the whole body of steam passing along the upper half of the steam-jackets and issuing at the rear end through pipe R, by which it will be taken in more or less condensed form to any desired point.

S S are any desired number of small open tubes leading from interior of cylinder through the steam-jacket to the outer air, by which steam from the peat produced by the evaporation of its moisture will be allowed to escape.

In some cases it may be found desirable to construct the helix proper in one with the shaft on which it revolves, or to make it hollow and communicating with the interior of such shaft, as shown in Fig. 7, so that the steam introduced into said shaft will pass into the helix, which will then co-operate to heat and dry the peat, as well as to compress and force it forward.

What I claim is as follows:

1. In an apparatus for converting peat into fuel, a casing having a frusto-conical shape, a helix or screw arranged axially therein adapted to force the peat from the wider to the narrower part of the case, a hopper to conduct the peat to the case, a tube for the exit of the compressed peat, and a heating-jacket about the casing, having an opening extending through it and communicating with the interior of the casing for the escape of the moisture expressed from the peat, all substantially as described.

2. In an apparatus for converting peat into fuel, a pair of rollers covered with yielding moisture expelling material, a hopper arranged to convey the crude material thereto, and a suitable carrier, substantially as described.

3. In a peat-machine, the casing composed of a cylinder and a frustum of a cone and provided with a steam-jacket and tubes S, in combination with helix J, as herein shown and described.

4. The combination of the casing composed of cylinder and frustum of a cone and provided with steam-jacket $i$ and helix J, mounted axially therein, cylinder L, with steam-jacket L' and tubes $l$ $l$, and diaphragms $p$ $p$ $p'$ $p'$, all as herein set forth.

Montreal, December 11, 1888.

A. A. DICKSON.

Witnesses:
  D. WENN SOANE,
  FRED. J. SEARS.